United States Patent [19]

Cable et al.

[11] Patent Number: 4,570,542
[45] Date of Patent: Feb. 18, 1986

[54] RIBBON RAIL SYSTEMS

[75] Inventors: Harold E. Cable, Thornburg Borough; Anil N. Rodrigues, Pittsburgh, both of Pa.

[73] Assignee: Weld Tooling Corporation, Pittsburgh, Pa.

[21] Appl. No.: 673,429

[22] Filed: Nov. 20, 1984

Related U.S. Application Data

[63] Continuation of Ser. No. 378,879, May 17, 1982, abandoned.

[51] Int. Cl.⁴ .................... B61B 13/04; E01B 25/02
[52] U.S. Cl. .................... 104/119; 105/29 R; 219/60 A; 228/29; 238/10 R; 238/123; 266/56
[58] Field of Search .................... 104/118, 119, 120; 238/1, 10 R, 122, 123; 105/29 R; 228/29; 409/179; 266/56, 67; 219/60 A

[56] References Cited

U.S. PATENT DOCUMENTS

| | | | |
|---|---|---|---|
| 3,226,027 | 12/1965 | Cable et al. | 238/1 |
| 3,884,153 | 5/1975 | Sugimoto | 238/123 X |
| 4,241,664 | 12/1980 | Cable | 104/118 |

Primary Examiner—Randolph A. Reese
Attorney, Agent, or Firm—Buell, Ziesenheim, Beck & Alstadt

[57] ABSTRACT

An elongate deformable ribbon drive rail for carrying a working apparatus having a toothed drive gear and support mechanism is provided in the form of a first narrow elongate strip of metal of width to carry the support mechanism, a second narrower strip of metal having a regular series of corrugations extending lengthwise thereof fixed to the first strip intermediate its edges at each valley of the second strip and adapted to be engaged by the toothed drive gear while the edges of the first strip engage the support mechanism.

9 Claims, 6 Drawing Figures

RIBBON RAIL SYSTEMS

This application is a continuation of my copending application Ser. No. 378,879, filed May 17, 1982, now abandoned.

This invention relates to ribbon rail systems and particularly to a ribbon type formable drive rail which is highly flexible and will take the contour of a base upon which applied.

There are numerous devices used in the metal working industries which require the use of a guide and drive track following the contour of the work piece upon which work is being carried out.

Typical of such devices is the track or rail used to guide and hold a welding and/or cutting machine against a selected work surface. The surface may be in any position-horizontal, vertical, overhead, at any angle, inside or outside a vessel, curved, straight, etc. Such situations are encountered in all areas of industry, e.g., in structural steel work, in machinery manufacture and repair, in ship building and ship repair, in containment vessels, tubing, conductors, etc. In some cases a rigid track or rail may be used but in many cases a flexible rail must be used and the degree of its flexibility, in many cases, determines the effectiveness and cost of the job. On ferrous metals the rail may be held on the work by means of holding magnets, which preferably are permanent plastic potted magnets. In those cases when the work is non-magnetic, the rail can be held in place by means of vacuum cups of appropriate configuration or continuous vacuum cup compartments appropriately segmented to obtain maximum adherence and conformity with the surface to which the rail is engaged. Typical of prior art devices for accomplishing this is that illustrated in Cable U.S. Pat. No. 3,226,027 issued Dec. 28, 1965. An effort to overcome the problems of flexibility without regard to surface position was made in Cable U.S. Pat. No. 4,241,664 issued Dec. 30, 1980. While the structure of that patent has been highly successful, it sometimes encounters problems with maintaining a proper gear tooth profile when bent and sometimes encounters problems of formability in manufacture and strength in use because of the need to draw gear teeth in the body of the rail.

The present invention overcomes these problems and provides a structure in which each tooth is a closed trapezoid whose profile is individually strong and the tooth profile can be readily maintained. The structure of the invention thus can take a heavy load and yet retain the tooth profile to mate properly with a drive gear.

We provide an elongate formable drive rail for carrying a working apparatus having a toothed driving gear drivingly engaging said rail and support means engaging a portion of the edge of the side rail for supporting said apparatus, said formable drive rail comprising an elongate narrow base strip of metal of width selected to carry said working apparatus, a regular series of corrugations formed in a separate strip extending lengthwise of one side of said strip intermediate its edges, and fixed thereto along the bottom of adjacent valleys, said corrugation corresponding substantially in shape and width along the median line of the strip to the tooth configuration of the toothed driving cog wheel or gear of said working apparatus. Preferably the separate corrugated strip is made of stainless steel and is fastened to the base strip by metallurgical bonding such as by resistance welding, brazing or the like. The gauge of the steel used in the corrugation should be such that the tooth face will provide sufficient resistance for driving but will permit deformation when the rail is bent around a curve or contour of a workpiece. Preferably, the drive rail is made of austentic stainless steel and is preferably of a substantially heavier gauge than the corrugated strip which is attached thereto. Preferably, the rail is provided on one side with magnet holding means or vacuum means depending upon the use to which it is applied. Successive lengths of track are joined by junction bars, drilled and tapped for receiving holding screws. Preferably, the corrugations are in the form of a stub tooth involute gear rack configuration.

The corrugated rail configuration of this invention provides the necessary stiffness or rigidity in cross section to carry any expected equipment, yet provides great flexibility over the length of the rail, coupled with light weight and easy handleability.

In the foregoing general description certain objects, purposes and advantages of this invention have been set out. Other objects, purposes and advantages of this invention will be apparent from a consideration of the following description and the accompanying drawings in which.

Figure 5:
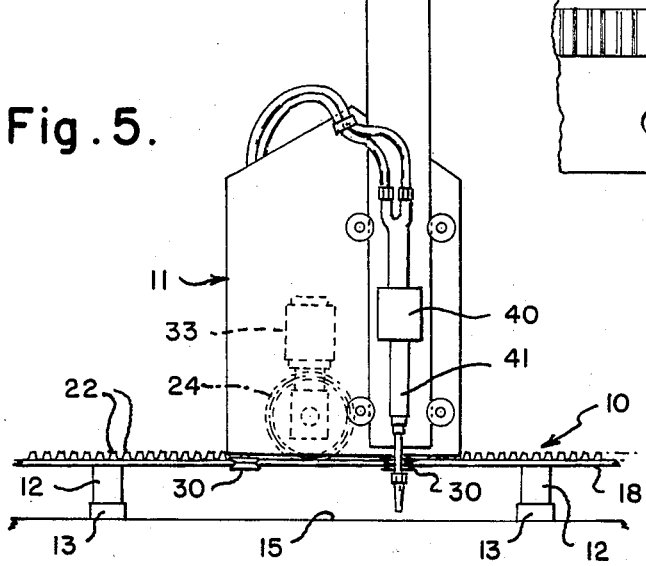
FIG. 5 is a side elevation of the track of FIG. 1 with a magnet holding means and travelling flame cutter/welder assembly thereon.
Figure 6:
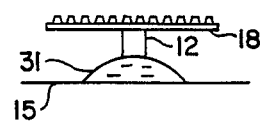
FIG. 6 is a fragmentary elevation of a track with vacuum cup holding means.

Referring to the drawings a track or rail 10 made in accordance with this invention is illustrated in conjunction with a travelling flame cutting/welding machine 11. The track or rail 10 may be provided with longitudinally spaced transversely extending cross members 12 fixed to the underside thereof and carrying permanent magnets 13 position in spaced relation to the underside of the outer ends of the cross members 12. The flame cutting/welding machine 11 is a conforming powered machine engaging the rail 10 along which it is adapted to travel, e.g., on a steel work surface 15 against which track 10 is magnetically held as shown in FIG. 5. In those cases where the work is non-magnetic, vacuum cups 31 are substituted for magnets 13.

Figure 1:
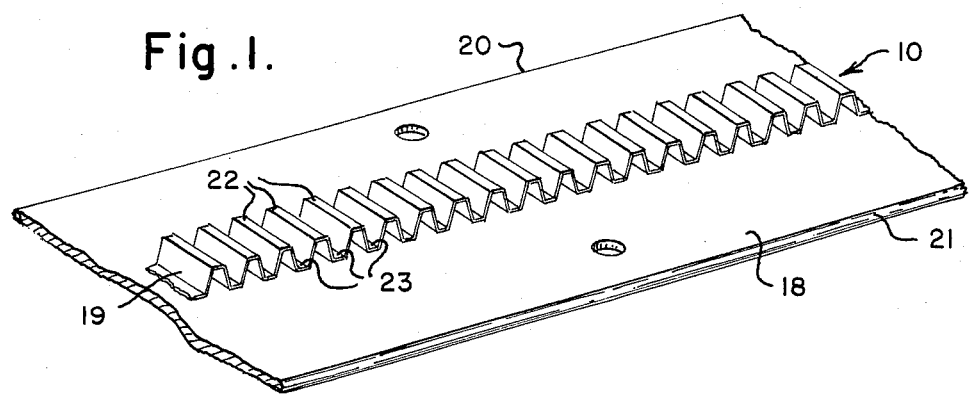
FIG. 1 is an isometric view of a track according to this invention utilized for a travelling flame cutting-/welding machine.
Figure 2:
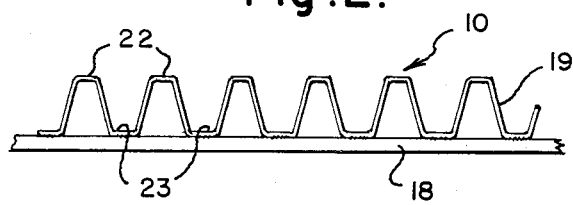
FIG. 2 is a side elevational view of the embodiment of FIG. 1.
Figure 3:
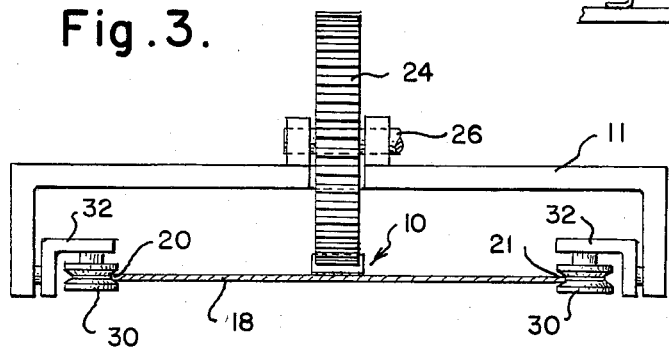
FIG. 3 is an end elevational view of the rail of FIG. 1 showing a cutting machine drive in place.
Figure 4:
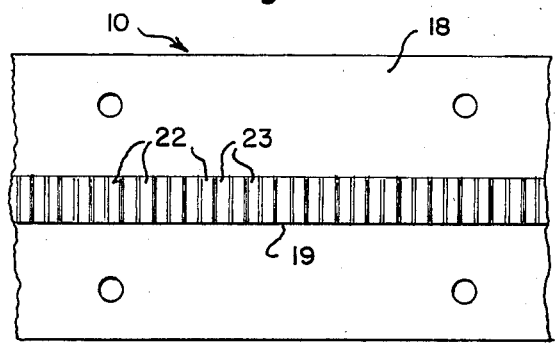
FIG. 4 is a top plan view of the track of FIG. 1.

The track or rail 10 comprises an elongate base band or ribbon of sheet metal 18 with each of side edges 20 and 21 forming a track on which the guide wheels 30 of the welding machine engage. The center or median portion of the strip carries a separate formed strip 19 having a series of successive corrugations 22 which are metallurgically bonded to base strip 18 at successive valleys 23. The corrugations 22 have a width generally equal to or greater than that of drive gear 24 on flame cutting/welding machine 11 and a contour corresponding to the contour of the gear teeth, preferably a stub tooth involute gear configuration as illustrated in FIG. 2 of standard 20° involute stub form.

The flame cutting/welding machine 11 has grooved wheels 30 mounted on swivel arms 32 at each corner which engage the edges 21 of rail 10. Thus, the machine is held on rail 10 regardless of the position of the track, i.e., horizontal, vertical, overhead, etc., with the drive gear 24 engaged in the median portion of corrugations 22 so that the machine is uniformly moved on the track by the drive gear and its motor 33 on machine 11. The motor 33 may be controlled from a source of electric power by electric wires, not shown, or by known electronic means, not shown. Machine 11 is provided with a torch holder 40 and torch 41 rigidly held thereby at a selected height and angle for cutting and/or welding upon work surface 15 as machine 11 is moved along rail 10.

The center line of corrugation 19 must be in the same vertical plane as the center line of the drive wheel 24.

As shown, the rail 10 is highly flexible so that it can be bent about a transverse axis and it may also be twisted to accomodate compound curves.

The base strip 18 is substantially thicker, i.e., heavier gauge, than the corrugated strip 19. This permits the strip 18 to be sufficiently thick and, by being reinforced by the rib formed by metallurgically bonding each succession valley 23 thereto, to resist transverse bending caused by the action of wheels 30 on its edges regardless of the size and weight of the welding machine 11. This construction provides a further advantage in that the lighter gauge corrugations permit movement of the gap in the corrugations so that when the rail is bent the gear teeth can enter and leave the corrugations without excessive binding or frictional resistance. Thus, the base strip can be optimized in stiffness to provide sufficient flexibility to follow the minimum desired radius but rigid enough to support the welding machine load which the corrugated rack is separately chosen in thickness to optimize formability consistent with providing sufficient strength for the teeth to support the driving load. As shown in the drawings, the corrugated rack is fixed at the root of each tooth to the base strip, preferably by resistance welding. This makes each tooth of the rack a closed trapezoid and stiffens its profile individually, As a result, each tooth of the corrugated rack can take considerable load as compared with a free or unsupported tooth and it retains its profile to mate properly with the drive gear. At the same time the root weld provides added transverse rigidity to the base strip without detrimentally affecting its flexibility.

In those cases where wider corrugations are used then they may be welded at at least two points across the root of each in order to attain the desired strength and rigidity.

While certain specific embodiments and practices of this invention have been illustrated and described in the foregoing specification, it will be understood that this invention may be otherwise embodied within the scope of the following claims.

1. An elongate formable drive rail for carrying a working apparatus having a toothed driving gear drivingly engaging said rail and support means engaging a portion of the edge of the side rail for supporting said apparatus comprising an elongate narrow flexible first strip of metal of width selected to carry said working apparatus, a second narrower strip of metal having a regular series of corrugations formed in said second strip extending lengthwise of said first strip intermediate its edges, said corrugations lying in planes transverse to the width of the first strip and corresponding substantially in shape and width along the median line of the strip to the tooth configuration of the toothed driving gear of said working apparatus and firmly fixed at each successive valley of the corrugations to said first strip on one face thereof to provide a drive rack engageable by the toothed drive gear of the apparatus, said drive rack and first strip being deformable in compound directions to follow the contour of an irregular work surface and to permit movement of the gap in the corrugations so that when the rail is bent the gear teeth can enter and leave the gap without excessive binding.

2. An elongate formable drive rail as claimed in claim 1 wherein both the first and second strip of the drive rail is made of stainless steel.

3. An elongate formable drive rail as claimed in claim 1 wherein the second strip is fixed to the first strip by a metallurgical bond.

4. An elongate formable drive rail as claimed in claim 3 wherein the metallurgical bond is a resistance weldment.

5. An elongate formable drive rail as claimed in any one of claims 1 through 4 wherein said rail has a plurality of spaced holding magnets on one side for engaging a ferromagnetic work piece.

6. An elongate formable drive rail as claimed in any one of claims 1 through 4 wherein said rail has a plurality spaced vacuum cups on one side for engaging a work piece.

7. An elongate formable drive rail as claimed in any one of claims 1 through 4 wherein said corrugations in the second strip are in the form of a stub tooth involute gear configuration.

8. An elongate formable drive rail as claimed in claim 5 wherein said corrugations in the second strip are in the form of a stub tooth involute gear configuration.

9. An elongate formable drive rail as claimed in claim 6 wherein said corrugations in the second strip are in the form of a stub tooth involute gear configuration.

* * * * *